US012644267B2

(12) United States Patent
Guo et al.

(10) Patent No.: US 12,644,267 B2
(45) Date of Patent: Jun. 2, 2026

(54) PNEUMATIC DRAIN VALVE DRIVING DEVICE

(71) Applicant: Kohler (China) Investment Co., Ltd., Shanghai (CN)

(72) Inventors: Bin Guo, Shanghai (CN); Bing Dai, Shanghai (CN)

(73) Assignee: Kohler (China) Investment Co., Ltd., Shanghai (CN)

( * ) Notice: Subject to any disclaimer, the term of this patent is extended or adjusted under 35 U.S.C. 154(b) by 147 days.

(21) Appl. No.: 18/584,795

(22) Filed: Feb. 22, 2024

(65) Prior Publication Data

US 2024/0295107 A1    Sep. 5, 2024

(30) Foreign Application Priority Data

Mar. 1, 2023    (CN) .......................... 202320360101.4

(51) Int. Cl.
  *E03D 1/34*      (2006.01)
  *E03D 1/012*     (2006.01)
      (Continued)

(52) U.S. Cl.
  CPC ............. *E03D 1/34* (2013.01); *E03D 1/0125* (2013.01); *E03D 1/142* (2013.01); *E03D 1/32* (2013.01); *E03D 5/02* (2013.01); *E03D 5/024* (2013.01); *E03D 5/028* (2013.01); *F16K 1/126* (2013.01); *F16K 7/07* (2013.01); *F16K 24/04* (2013.01); *F16K 31/1223* (2013.01); *F16K 31/124* (2013.01); *F16K 31/1266* (2013.01); *F16K 31/128* (2013.01); *F16K 31/426* (2013.01)

(58) Field of Classification Search
  CPC ......... E03D 1/34; E03D 1/0125; E03D 1/142;
      E03D 1/32; E03D 5/02; E03D 5/024;
      E03D 5/028; F16K 1/126; F16K 7/07;
      F16K 24/04; F16K 31/1223; F16K
      31/124; F16K 31/1266; F16K 31/128;
      F16K 31/426
  See application file for complete search history.

(56)       References Cited

U.S. PATENT DOCUMENTS 2,760,204 A * 8/1956 Joanis ..................... E03D 5/024
                                                    4/367
8,464,998 B2 * 6/2013 Maercovich .......... F16K 31/404
                                                    251/38

FOREIGN PATENT DOCUMENTS

CN          87208405 U  *  3/1988
EP          1719846 A2 * 11/2006  ............. E03D 1/144
EP          3191653 B1 *  2/2020  ............... E03D 1/06

* cited by examiner

*Primary Examiner* — Atif H Chaudry
(74) *Attorney, Agent, or Firm* — Lempia Summerfield Katz LLC

(57)       ABSTRACT

A pneumatic drain valve driving device includes a cylinder, including a cylinder body and an air chamber. The air chamber includes an air chamber communication port in air communication with an outside of the cylinder body; and an air chamber exhaust port configured to be connected to a pneumatic drain valve. The cylinder also includes a liquid chamber, including a drain hole configured to receive a slide valve. The cylinder also includes a piston disposed in the cylinder body. The device also includes a pilot valve, connected to the liquid chamber through a waterway and including a pilot valve control port. The device also includes a linkage trigger mechanism disposed between the pilot valve control port and the slide valve and configured to control an opening and a closing of the pilot valve control port and the slide valve.

14 Claims, 16 Drawing Sheets

C-C

(51) Int. Cl.

| | | |
|---|---|---|
| *E03D 1/14* | (2006.01) | |
| *E03D 1/32* | (2006.01) | |
| *E03D 5/02* | (2006.01) | |
| *F16K 1/12* | (2006.01) | |
| *F16K 7/07* | (2006.01) | |
| *F16K 24/04* | (2006.01) | |
| *F16K 31/122* | (2006.01) | |
| *F16K 31/124* | (2006.01) | |
| *F16K 31/126* | (2006.01) | |
| *F16K 31/128* | (2006.01) | |
| *F16K 31/42* | (2006.01) | |

A-A

B-B

C-C

27

6

321

311

4

D-D

E-E

F-F

G-G

H-H

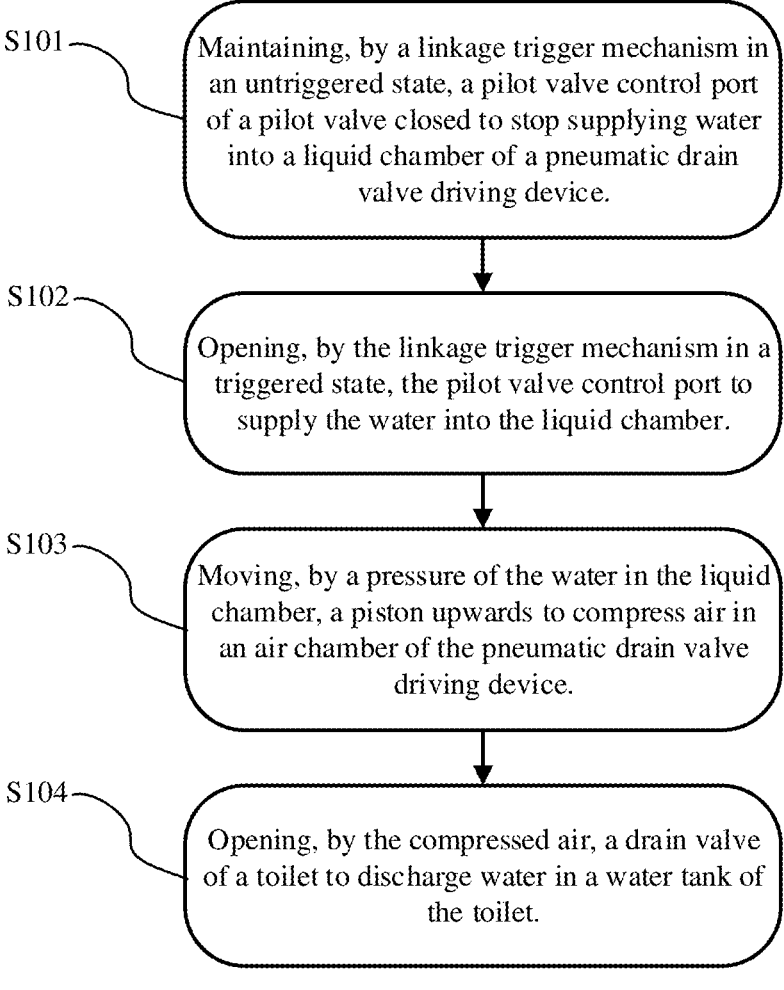

S101 — Maintaining, by a linkage trigger mechanism in an untriggered state, a pilot valve control port of a pilot valve closed to stop supplying water into a liquid chamber of a pneumatic drain valve driving device.

S102 — Opening, by the linkage trigger mechanism in a triggered state, the pilot valve control port to supply the water into the liquid chamber.

S103 — Moving, by a pressure of the water in the liquid chamber, a piston upwards to compress air in an air chamber of the pneumatic drain valve driving device.

S104 — Opening, by the compressed air, a drain valve of a toilet to discharge water in a water tank of the toilet.

FIG. 20

PNEUMATIC DRAIN VALVE DRIVING DEVICE

CROSS REFERENCE TO RELATED APPLICATION

This application claims the benefit of priority to: Chinese Patent Application No. 202320360101.4 filed in the Chinese Intellectual Property Office on Mar. 1, 2023, which is hereby incorporated by reference in its entirety.

FIELD

The present disclosure relates to the field of pneumatic drain valve driving technology for a toilet and particularly relates to a pneumatic drain valve driving device.

BACKGROUND

A pneumatic drain valve is a drainage component of a toilet, and the opening and closing of the pneumatic drain valve are controlled by a pneumatic mechanism. When the pneumatic mechanism supplies air to the pneumatic drain valve, an air bag of the pneumatic drain valve expands to cause an overflow pipe to rise, and the pneumatic drain valve is opened to drain water.

A pneumatic mechanism mainly uses a handle to push a cylinder to supply atmospheric pressure air to the pneumatic drain valve. A stroke required by the handle is large, and a force required to push the handle is also relatively large. Thus, the performance of the pneumatic mechanism needs to be improved.

SUMMARY

The present disclosure aims to overcome the defects in the technology and provide a new pneumatic drain valve driving device. When using the pneumatic drain valve driving device of the present disclosure, the user only needs to simply press a linkage trigger mechanism, and air in an air chamber can be compressed by a piston and then can be discharged into the drain valve through the air chamber exhaust port. The required force and the required operation stroke are relatively small. The pneumatic drain valve driving device facilitates the operation and enhances the performance of the product.

According to embodiment of the present disclosure, a pneumatic drain valve driving device includes a cylinder, a pilot valve, and a linkage trigger mechanism disposed between the cylinder and the pilot valve.

The cylinder comprises a cylinder body and a piston disposed in the cylinder body, and the piston divides a chamber of the cylinder body into an air chamber and a liquid chamber.

The air chamber includes an air chamber communication port in air communication with an outside and includes an air chamber exhaust port configured to be connected to a pneumatic drain valve.

The liquid chamber includes a drain hole, and a slide valve is disposed in the drain hole.

The pilot valve includes a pilot valve control port, and the pilot valve is connected to the liquid chamber through a waterway.

The linkage trigger mechanism is disposed between the pilot valve control port and the slide valve and is configured to control an opening and a closing of the pilot valve control port and the slide valve.

When the linkage trigger mechanism is in an initial state (e.g., an untriggered state), the pilot valve control port is in a closed state, the slide valve opens the drain hole, and the waterway stops supplying water.

When the linkage trigger mechanism is in a triggered state, the pilot valve control port is in an opened state, the slide valve is closes the drain hole, the waterway supplies the water, the liquid chamber stores the water, and the air chamber exhaust port exhausts air.

In another embodiment, the linkage trigger mechanism includes a first rocker arm pivotably connected to the cylinder body, and an end of the first rocker arm includes a rocker arm trigger end configured to be in contact with and separated from the slide valve.

The linkage trigger mechanism also includes a second rocker arm pivotally connected to a valve case of the pilot valve, and an end of the second rocker arm includes a rocker arm sealing end configured to close and open the pilot valve control port.

The linkage trigger mechanism also includes a button connected between the first rocker arm and the second rocker arm.

The linkage trigger mechanism also includes a resilient reset member connected to the button, the first rocker arm, and/or the second rocker arm.

When the button is in an initial state (e.g., an untriggered state), the rocker arm trigger end remains in contact with the slide valve, and the rocker arm sealing end maintains the pilot valve control port closed.

When the button is in a triggered state, the rocker arm trigger end is separated from the slide valve, and the rocker arm sealing end is separated from the pilot valve control port to open the pilot valve control port.

In another embodiment, the resilient reset member includes a first resilient reset member connected to the first rocker arm and includes a second resilient reset member connected to the second rocker arm.

In another embodiment, the cylinder body is mounted with a trigger mechanism. The trigger mechanism includes a trigger slidably connected to the cylinder body and includes a resilient driving member configured to drive the trigger to move towards the rocker arm trigger end.

The rocker arm trigger end includes a limiting step. When the rocker arm trigger end is in an initial state (e.g., an untriggered state), the rocker arm trigger end is in contact with the slide valve, the slide valve opens the drain hole, and the trigger is disposed on a side of the limiting step.

When the rocker arm trigger end is in a triggered state, the rocker arm trigger end leaves or is separated from the slide valve, the slide valve closes the drain hole, and an end of the trigger fits in or is engaged with the limiting step.

In another embodiment, a movable rod is disposed on a side of the trigger, and the movable rod extends into the air chamber through the air chamber communication port.

A flange is disposed on the piston and configured to jack or raise up the movable rod.

In another embodiment, a bracket is disposed on a side of the cylinder body, and the trigger is disposed on the bracket.

The bracket is provided with a guiding hole, and the trigger extends through the guiding hole with a clearance therebetween.

In another embodiment, the slide valve includes a slide valve body, a slide valve connection lever, and a slide valve sealing end connected in sequence.

The slide valve body is disposed on an outer side of the cylinder body, the slide valve connection lever extends through the drain hole with a clearance therebetween, and the slide valve sealing end is disposed in the liquid chamber.

The slide valve also includes a resilient actuating member configured to drive the slide valve to slide outwardly and connected between the slide valve body and the cylinder body.

When the button is in an initial state (e.g., an untriggered state), the rocker arm trigger end presses the slide valve body.

When the button is in a triggered state, the rocker arm trigger end is separated from the slide valve body.

In another embodiment, the slide valve sealing end is assembled with a slide valve sealing ring.

In another embodiment, a resilient reset element is disposed in the air chamber and configured to drive the piston to reset.

In another embodiment, a first sealing ring is disposed on an end of the piston and configured to form a seal with a chamber wall of the air chamber, and a second sealing ring is disposed on the other end of the piston and configured to form a seal with the chamber wall of the liquid chamber.

By adopting the above embodiments, the present disclosure has the following beneficial effects:

In the pneumatic drain valve driving device, when the linkage trigger mechanism is not triggered, the linkage trigger mechanism closes the pilot valve control port, the waterway stops supplying water to the liquid chamber, the linkage trigger mechanism causes the slide valve to open the drain hole, the piston is disposed in a lower portion of the liquid chamber, and the air enters into the air chamber from the air chamber communication port.

After the linkage trigger mechanism is operated, the linkage trigger mechanism acts to open the pilot valve control port, and the waterway starts supplying the water to the liquid chamber. The linkage trigger mechanism acts to allow the slide valve to close the drain hole, the water enters into the liquid chamber for storage, and the piston is jacked up by the water and compresses the air in the air chamber. Thus, the compressed air in the air chamber is release to the drain valve through the air chamber exhaust port. Less force and operation stroke are required. Thus, the pneumatic drain valve driving device may facilitate the operation and enhance the performance of the product.

BRIEF DESCRIPTION OF THE FIGURES

With reference to the drawings, the contents disclosed by the present disclosure should be more easily understood. It should be understood that these drawings are merely used for illustration and are not intended to limit the protection scope of the present disclosure. In the drawings:

FIG. 1 is a front view of a pneumatic drain valve driving device when a linkage trigger mechanism is in an initial state according to an embodiment of the present disclosure, with;

4

Figure 7:
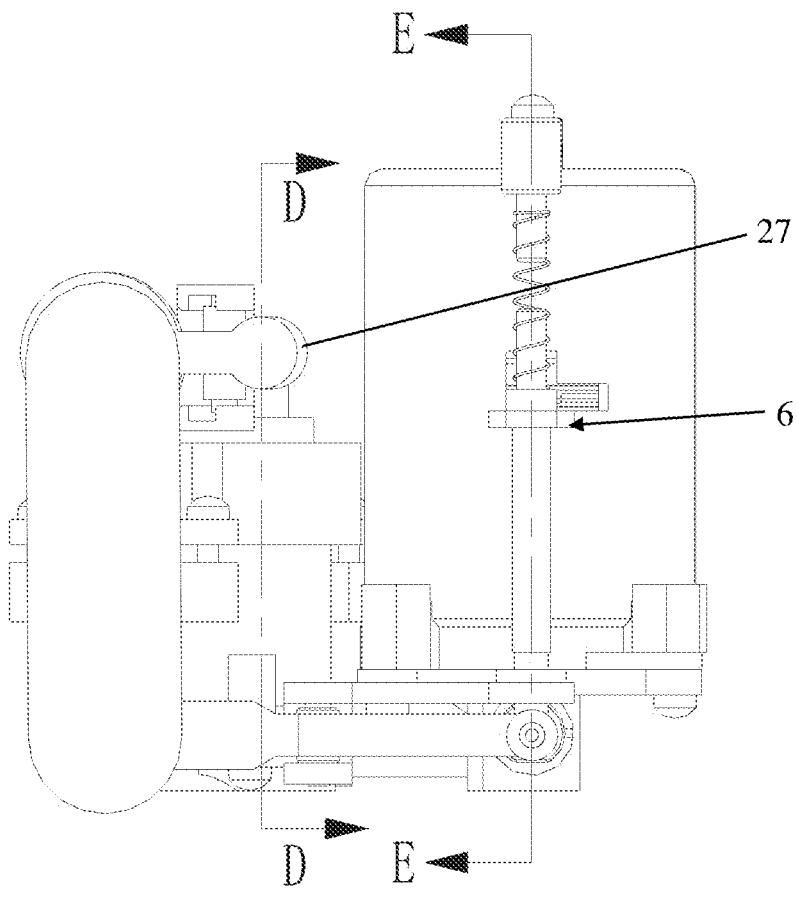
FIG. 7 is a front view of the pneumatic drain valve driving device when the linkage trigger mechanism is in a triggered state according to an embodiment of the present disclosure.
Figure 8:
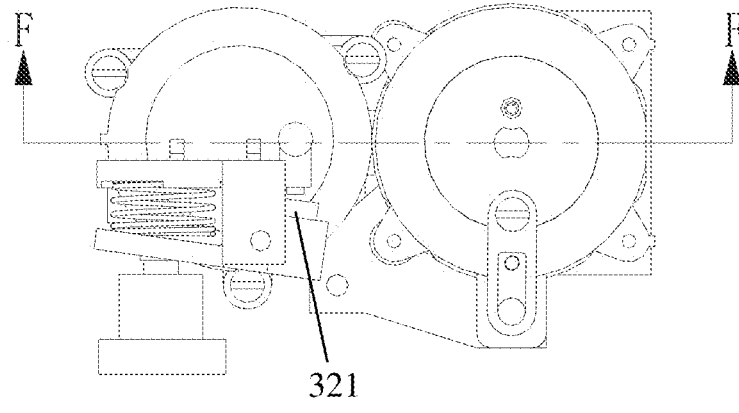
Figure 9:
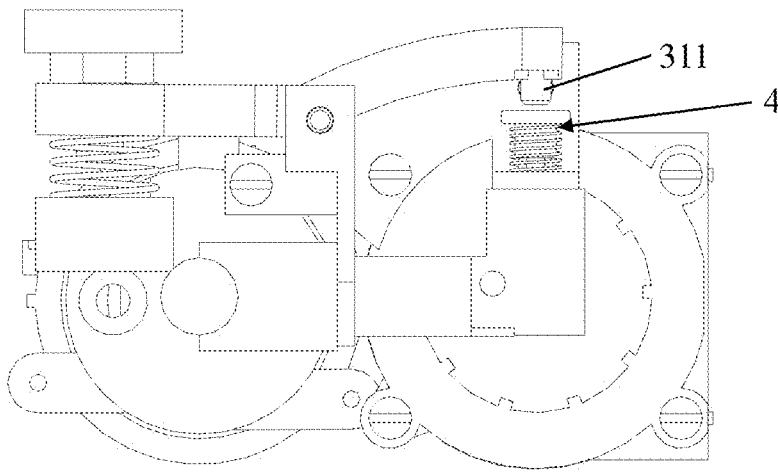
Figure 10:
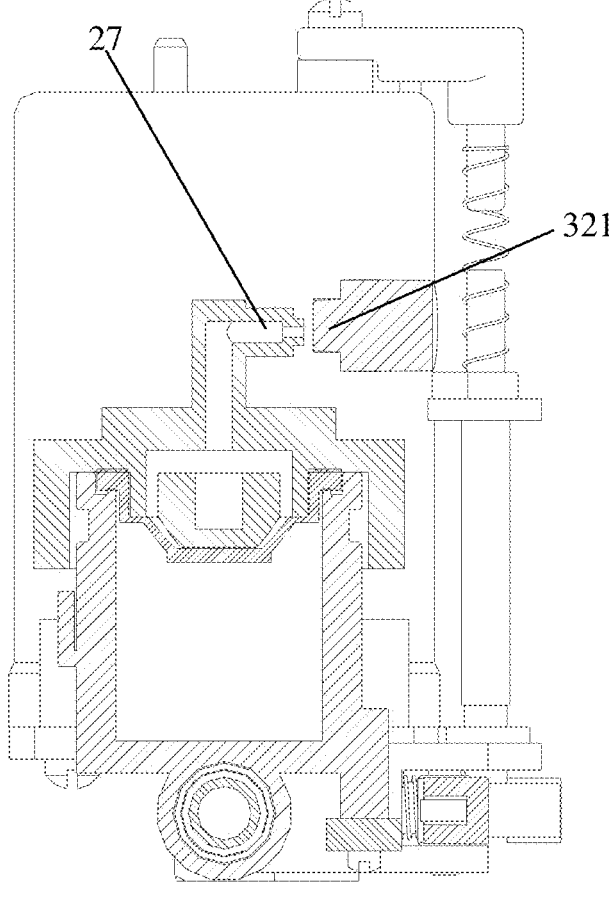
Figure 11:
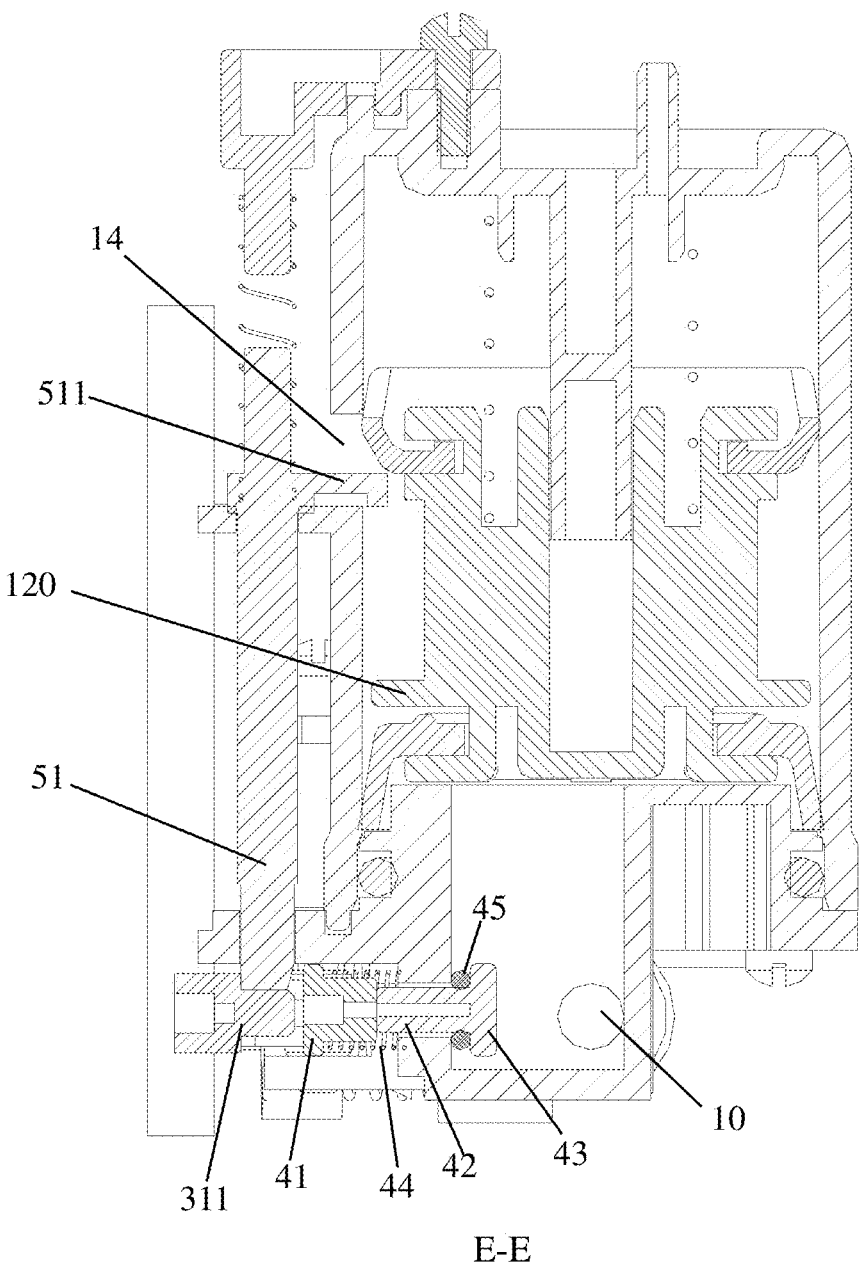
Figure 12:
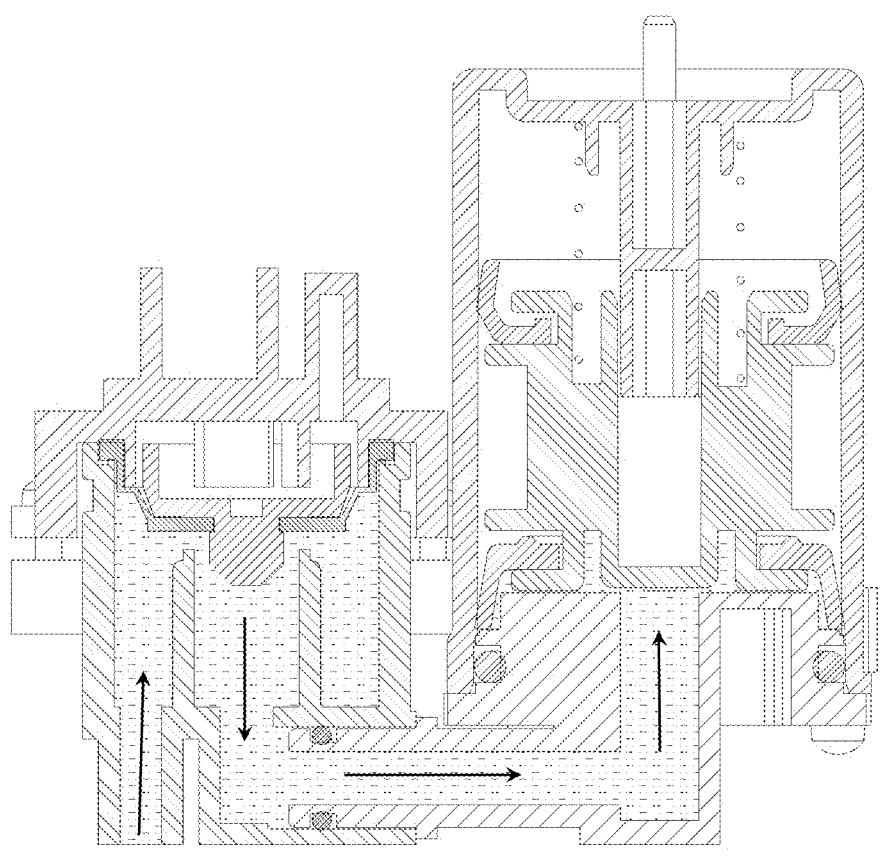
Figure 13:
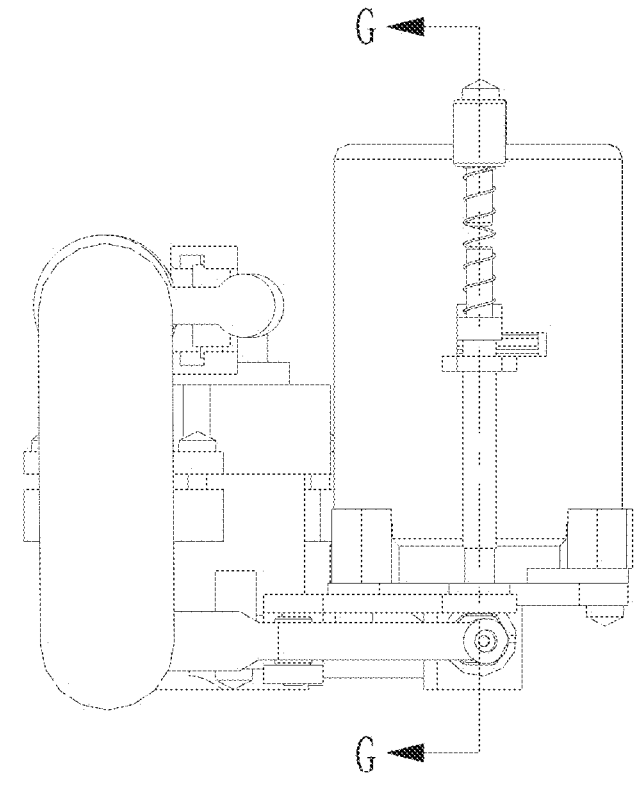
Figure 14:
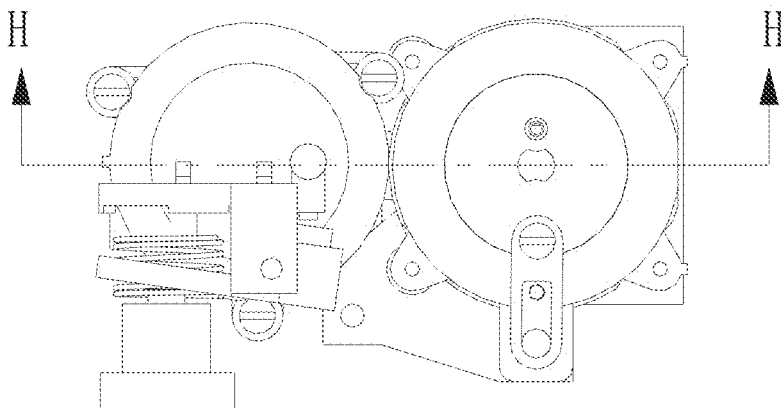
Figure 15:
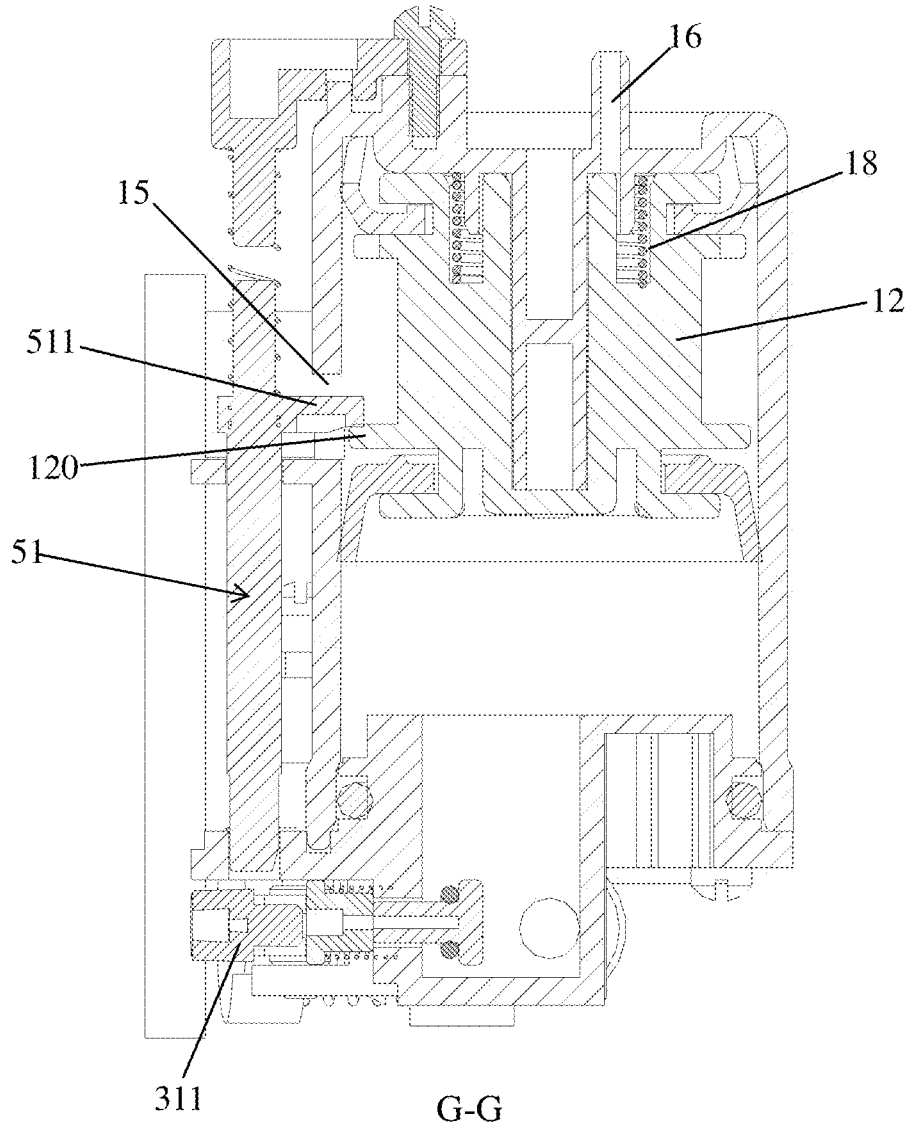
Figure 16:
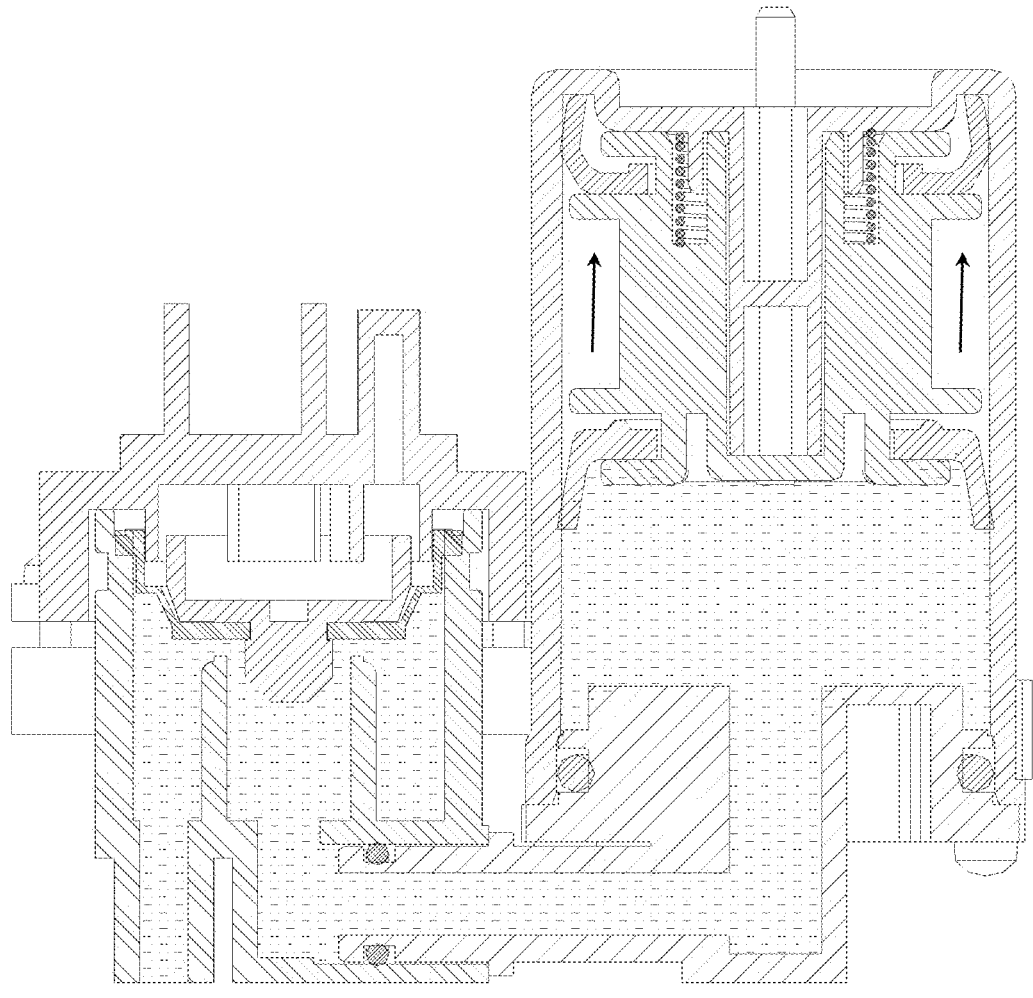
Figure 17:
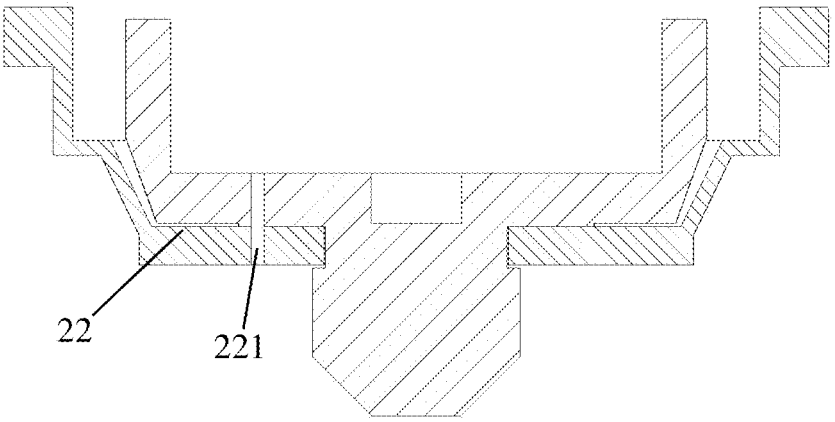
Figure 18:
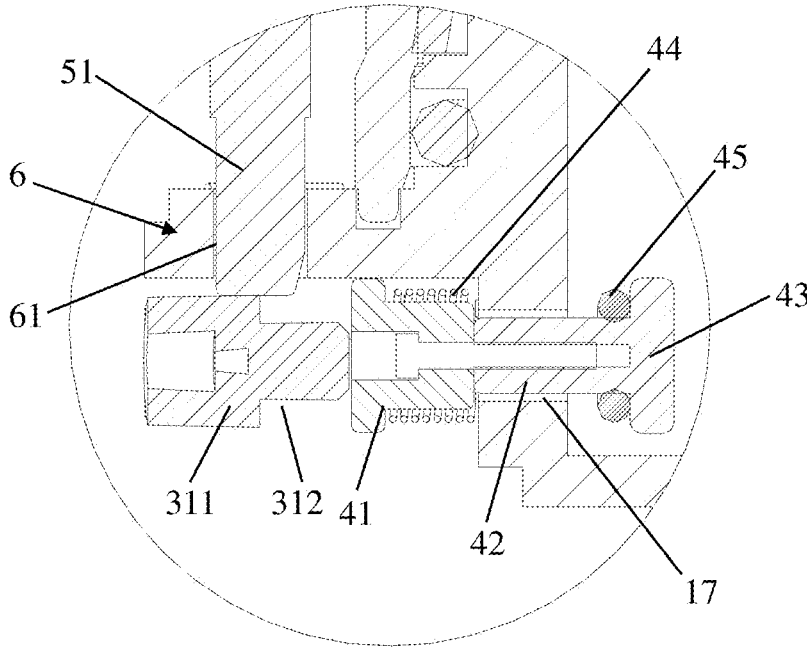
Figure 19:
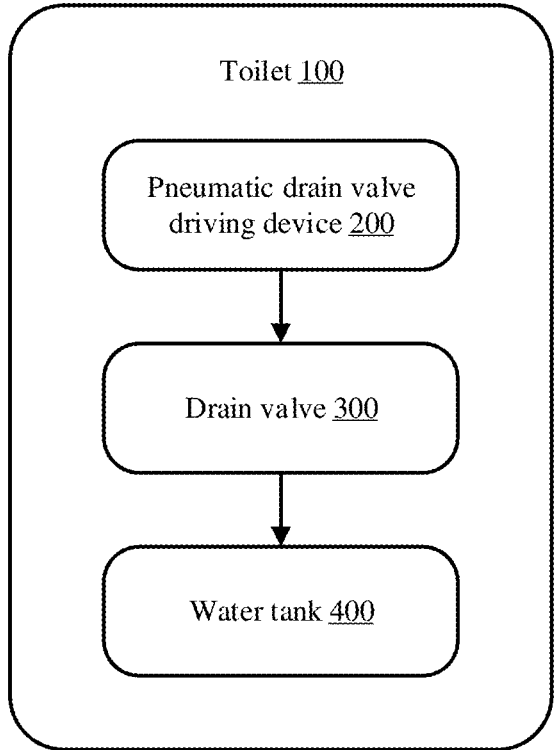

FIG. 8 is a top view of the pneumatic drain valve driving device shown in FIG. 7;

FIG. 9 is a bottom view of the pneumatic drain valve driving device shown in FIG. 7;

FIG. 10 is a sectional view of the pneumatic drain valve driving device shown in FIG. 7 along a D-D direction;

FIG. 11 is a sectional view of the pneumatic drain valve driving device shown in FIG. 7 along an E-E direction;

FIG. 12 is a sectional view of the pneumatic drain valve driving device shown in FIG. 8 along an F-F direction;

FIG. 13 is a front view of the pneumatic drain valve driving device when compressed air is discharged from an air chamber according to an embodiment of the present disclosure;

FIG. 14 is a top view of the pneumatic drain valve driving device shown in FIG. 13;

FIG. 15 is a sectional view of the pneumatic drain valve driving device shown in FIG. 13 along a G-G direction;

FIG. 16 is a sectional view of the pneumatic drain valve driving device shown in FIG. 14 along an H-H direction;

FIG. 17 is a sectional view of a diaphragm valve provided with a valve communication hole;

FIG. 18 is a partially enlarged view showing the trigger leaving a limit step of a rocker arm trigger end and a slide valve opening a drain hole;

FIG. 19 is a schematic view of a toilet, including the pneumatic drain valve driving device according to an example of the present disclosure; and FIG. 20 is a flow chart of a method for flushing a toilet by using a pneumatic drain valve driving device according to an example of the present disclosure.

DETAILED DESCRIPTION

The specific embodiments of the present disclosure are further described with reference to the drawings hereinafter. Same or equivalent parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

As shown in FIGS. 1-17, a pneumatic drain valve driving device according to an embodiment of the present disclosure comprises a cylinder 1, a pilot valve 2, and a linkage trigger mechanism 3 disposed between the cylinder 1 and the pilot valve 2.

The cylinder 1 comprises a cylinder body 11 and a piston 12 disposed in the cylinder body 11. The piston 12 divides a chamber of the cylinder body 11 into an air chamber 13 and a liquid chamber 14.

The air chamber 13 comprises an air chamber communication port 15 in air communication with an external place (e.g., an outside of the cylinder body 11) and comprises an air chamber exhaust port 16 configured to be connected to a pneumatic drain valve.

The liquid chamber 14 is provided with a drain hole 17, and a slide valve 4 is mounted in the drain hole 17.

The pilot valve 2 comprises a pilot valve control port 27, the pilot valve 2 is connected to the liquid chamber 14 through a waterway 10.

The linkage trigger mechanism 3 is disposed between the pilot valve control port 27 and the slide valve 4 and is configured to control the opening and the closing of the pilot valve control port 27 and the slide valve 4.

When the linkage trigger mechanism 3 is in an initial state (e.g., an untriggered state), the pilot valve control port 27 is in a closed state, the slide valve 4 is in a state of opening the drain hole 17, and the waterway 10 is in a state of stopping water supply.

When the linkage trigger mechanism 3 is in a triggered state, the pilot valve control port 27 is in an open state, the slide valve 4 is in a state of closing the drain hole 17, the waterway 10 is in a state of supplying water, the liquid chamber 14 is in a state of storing water, and the air chamber exhaust port 16 is in a state of exhausting air.

The pneumatic drain valve driving device of the present disclosure is configured to control the opening and the closing of a pneumatic exhaust valve of a toilet.

The pneumatic drain valve driving device comprises a cylinder 1, a pilot valve 2, a linkage trigger mechanism 3, and a slide valve 4.

The cylinder 1 comprises a cylinder body 11 and a piston 12. The piston 12 is disposed in the cylinder body 11 and can slide up and down in the cylinder body 11 and form a seal with the cylinder body 11. A chamber body of the cylinder body 11 is divided into upper and lower portions by the piston 12, the upper portion of the chamber is an air chamber 13, and the lower portion of the chamber is a liquid chamber 14. A side portion of the air chamber 13 is provided with an air chamber communication port 15, which is in air communication with the external atmosphere. A top portion of the air chamber 13 comprises an air chamber exhaust port 16 configured to be connected to a pneumatic drain valve to supply compressed air into the pneumatic drain valve. A side portion of the liquid chamber 14 is provided with a drain hole 17, and the slide valve 4 is disposed in the drain hole 17 and configured to control the opening and the closing of the drain hole 17.

The pilot valve 2 comprises a valve case 21, a diaphragm valve 22, a liquid inlet 26, and a pilot valve control port 27. The valve case 21 comprises a chamber body, and the liquid inlet 26 and the pilot valve control port 27 are in communication with the chamber body respectively. The chamber body is also connected to the liquid chamber 14 through a waterway 10.

When the pilot valve control port 27 is closed, the diaphragm valve 22 closes the waterway 10, and the waterway 10 stops supplying the water to the liquid chamber 14. When the pilot valve control port 27 is opened, the diaphragm valve 22 opens the waterway 10, and the waterway 10 supplies the water into the liquid chamber 14.

When the slide valve 4 closes the drain hole 17 and the waterway 10 supplies water to the liquid chamber 14, the water is accumulated in the liquid chamber 14, and the piston 12 is jacked (e.g., raised) upwards by the water pressure. The air in the air chamber 13 is compressed, and the compressed air enters the drain valve through the air chamber exhaust port 16 to drive the drain valve to open. Thus, the water from the water tank may be discharged for flushing the toilet.

Upon completion of the air exhaustion, the slide valve 4 opens the drain hole 17, the piston 12 drops to reset, and the water in the water chamber 14 is discharged from the drain hole 17. The pilot valve control port 27 is closed, and the waterway 10 stops supplying water.

The pneumatic drain valve driving device according to the present disclosure uses a linkage trigger mechanism 3 to control the opening and the closing of the slide valve 4 and the opening and the closing of the drain hole 17. The user only needs to trigger the linkage trigger mechanism 3.

When the linkage trigger mechanism 3 is in the initial state, i.e., when the user does not trigger the linkage trigger mechanism 3 (e.g., in an "untriggered state"), the linkage trigger mechanism 3 keeps the pilot valve control port 27 in a closed state, and the linkage trigger mechanism 3 acts on the slide valve 4 to keep the drain hole 17 open. At this time, the waterway 10 stops supplying the water to the liquid chamber 14, and the piston 12 is disposed in the liquid chamber 14. External air enters the air chamber 13 through the air chamber communication port 15.

When the linkage trigger mechanism 3 is in the triggered state, i.e., when the user triggers and operates the linkage trigger mechanism 3, the linkage trigger mechanism 3 moves away from the pilot valve control port 27, the pilot valve control port 27 is opened, the linkage trigger mechanism 3 moves away from the slide valve 4, and the slide valve 4 closes the drain hole 17. At this time, the waterway 10 starts supplying the water, and the water enters into the liquid chamber 14 through the waterway 10, and the liquid chamber 14 is in the state of storing the water. The piston 12 is jacked (e.g., raised) up to move upwards, the air in the air chamber 13 is compressed, the compressed air enters the drain valve through the air chamber exhaust port 16 to drive the drain valve to open, and the water in the water tank is discharged for flushing the toilet.

To sum up, in the pneumatic drain valve driving device according to the present disclosure, when the linkage trigger mechanism 3 is not triggered, the pilot valve control port 27 is closed by the linkage trigger mechanism 3, the waterway 10 stops supplying the water, the linkage trigger mechanism 3 causes the slide valve 4 to open the drain hole 17, the piston 12 is located in a lower portion of the liquid chamber 14, and the air enters into the air chamber 13 through an air chamber communication port 15.

When the linkage trigger mechanism 3 is operated, the linkage trigger mechanism 3 is actuated to open the pilot valve control port 27, and the waterway 10 supplies the water to the liquid chamber 14. The linkage trigger mechanism 3 causes the slide valve 4 to close the drain hole 17, the water enters into the liquid chamber 14 for storage, and the piston 12 is jacked up by the water and compresses the air in the air chamber 13. Thus, the compressed air in the air chamber 13 is released to the drain valve through the air chamber exhaust port 16, and less force and operation stroke are required. It is convenient for the user to operate the pneumatic drain valve driving device, and the performance of the product may be improved.

The linkage trigger mechanism 3 may be a link mechanism, a rocker arm mechanism, an electronic valve control mechanism, or other mechanism device configured to control the opening and the closing of the slide valve 4 and the pilot valve control port 27.

In an embodiment, as shown in FIGS. 1-17, the diaphragm valve 22 works with separating ribs of the valve case 21 to separate the chamber body of the valve case 21 into a first chamber 23, a second chamber 24, and a third chamber 25. The diaphragm valve 22 is provided with a valve plate communication hole 221 in communication with the first chamber 23 and the second chamber 24. The first chamber 23 is located above the diaphragm valve 22, and the second chamber 24 is in communication with the first chamber 23 through the valve plate communication hole 221. The diameter of the valve plate communication hole 221 is small (e.g., smaller than a predetermined size) and only allows a very small water flow to pass through. The second chamber 24 and the third chamber 25 are both located below the diaphragm valve 22, and the second chamber 24 and the third chamber 25 are separated by an annular separating rib 28. A liquid inlet 26 is in communication with the second chamber 24, a pilot valve control port 27 is in communication with the first chamber 23, and a waterway 10 is connected to the third chamber 25.

When the pilot valve control port 27 is closed, the water in the second chamber 24 can enter the first chamber 23 through the valve plate communication hole 221, and both the second chamber 24 and the first chamber 23 are filled with water, and the water pressure in both chambers are the same. Because the bearing area of the diaphragm valve 22 facing the first chamber 23 is larger than the bearing area facing the second chamber 24, the pressure above the diaphragm valve 22 is larger than the pressure below the diaphragm valve 22, the diaphragm valve 22 presses the annular separating rib 28, and the second chamber 24 is disconnected with and thus not in communication with the third chamber 25.

When the pilot valve control port 27 is opened, the pressure in the first chamber 23 becomes smaller and becomes substantially the same as the atmospheric pressure. Thus, the pressure in the second chamber 24 is becomes larger than the pressure in the first chamber 23, and the diaphragm valve 22 is jacked up away from the annular separating rib 28, and the second chamber 24 is in communication with the third chamber 25. The water enters from the second chamber 24 into the third chamber 25 and then enters through the waterway 10 into the liquid chamber 14.

In an embodiment, as shown in FIGS. 1-17, the linkage trigger mechanism 3 comprises a first rocker arm 31 pivotably connected to the cylinder body 11, and one end of the first rocker arm 31 comprises a rocker arm trigger end 311 configured to be in contact with or separated from the slide valve 4.

The linkage trigger mechanism 3 also comprises a second rocker arm 32 pivotally connected to the valve case 21, and one end of the second rocker arm 32 comprises a rocker arm sealing end 321 configured to close and open the pilot valve control port 27.

The linkage trigger mechanism 3 also comprises a button 33 connected between the first rocker arm 31 and the second rocker arm 32.

The linkage trigger mechanism 3 also comprises a resilient reset member 34 connected to the button 33, the first rocker arm 31, and/or the second rocker arm 32.

When the button 33 is in an initial state (e.g., an untriggered state), the rocker arm trigger end 311 remains in contact with the slide valve 4, and the rocker arm sealing end 321 maintains the pilot valve control port 27 closed.

When the button 33 is in the triggered state, the rocker arm trigger end 311 is separated from the slide valve 4, and the rocker arm sealing end 321 is separated from the pilot valve control port 27 to open the pilot valve control port 27.

In this embodiment, the linkage trigger mechanism 3 uses a rocker arm structure, which comprises a first rocker arm 31, a second rocker arm 32, a button 33 and a resilient reset member 34.

The first rocker arm 31 is mounted on the cylinder body 11 by a first rotary shaft. One end of the first rocker arm 31 towards the slide valve 4 comprises a rocker arm trigger end 311, and the rocker arm trigger end 311 is configured to be in contact with and separated from the slide valve 4. When the rocker arm trigger end 311 presses the slide valve 4, the slide valve 4 opens the drain hole 17. When the rocker arm trigger end 311 moves away from the slide valve 4, the slide valve 4 closes the drain hole 17.

The second rocker arm 32 is mounted to the valve case 21 by a second rotary shaft. One end of the second rocker arm 32 towards the air chamber exhaust port 16 comprises a rocker arm sealing end 321. The rocker arm sealing end 321 may be a sealing plug. When the rocker arm sealing end 321 blocks the pilot valve control port 27, the pilot valve control port 27 is closed. When the rocker arm sealing end 321 moves away from the pilot valve control port 27, the pilot valve control port 27 is opened.

In another embodiment, the first rocker arm 31 may be disposed at a lower end of the cylinder body 11, and the second rocker arm 32 may be selectively disposed at an upper end of the valve case 21.

A button 33 is connected between the first rocker arm 31 and the second rocker arm 32, and the button 33 is arranged vertically for user operation and pressing.

The resilient reset member 34 may be a spring, an elastic sheet, etc., which is used to drive the linkage trigger mechanism 3 to reset. The resilient reset member 34 may be connected between the button 33 and the valve case 21/the cylinder body 11, and/or, the resilient reset member 34 may be connected between the first rocker arm 31 and the cylinder body 11, and/or, the resilient reset member 34 may be connected between the second rocker arm 32 and the valve case 21.

When the user has not triggered the button 33, and under the action of the resilient reset member 34, the first rocker arm 31 and the second rocker arm 32 each are held in the corresponding positions, the rocker arm trigger end 311 presses the slide valve 4, and the rocker arm sealing end 321 seals or blocks the pilot valve control port 27.

When the user presses the button 33 to put it in the triggered state, the first rocker arm 31 and the second rocker arm 32 rotate respectively. The rocker arm trigger end 311 is separated from the slide valve 4, and the slide valve 4 opens the drain hole 17. The rocker arm sealing end 321 is separated from the pilot valve control port 27, and thus the pilot valve control port 27 is opened.

The user only needs to operate and press the button 33 once to control the opening and the closing of the pilot valve control port 27 and the slide valve 4 with a small stroke and a small force. The operation of the pneumatic drain valve driving device is convenient.

Figure 1:
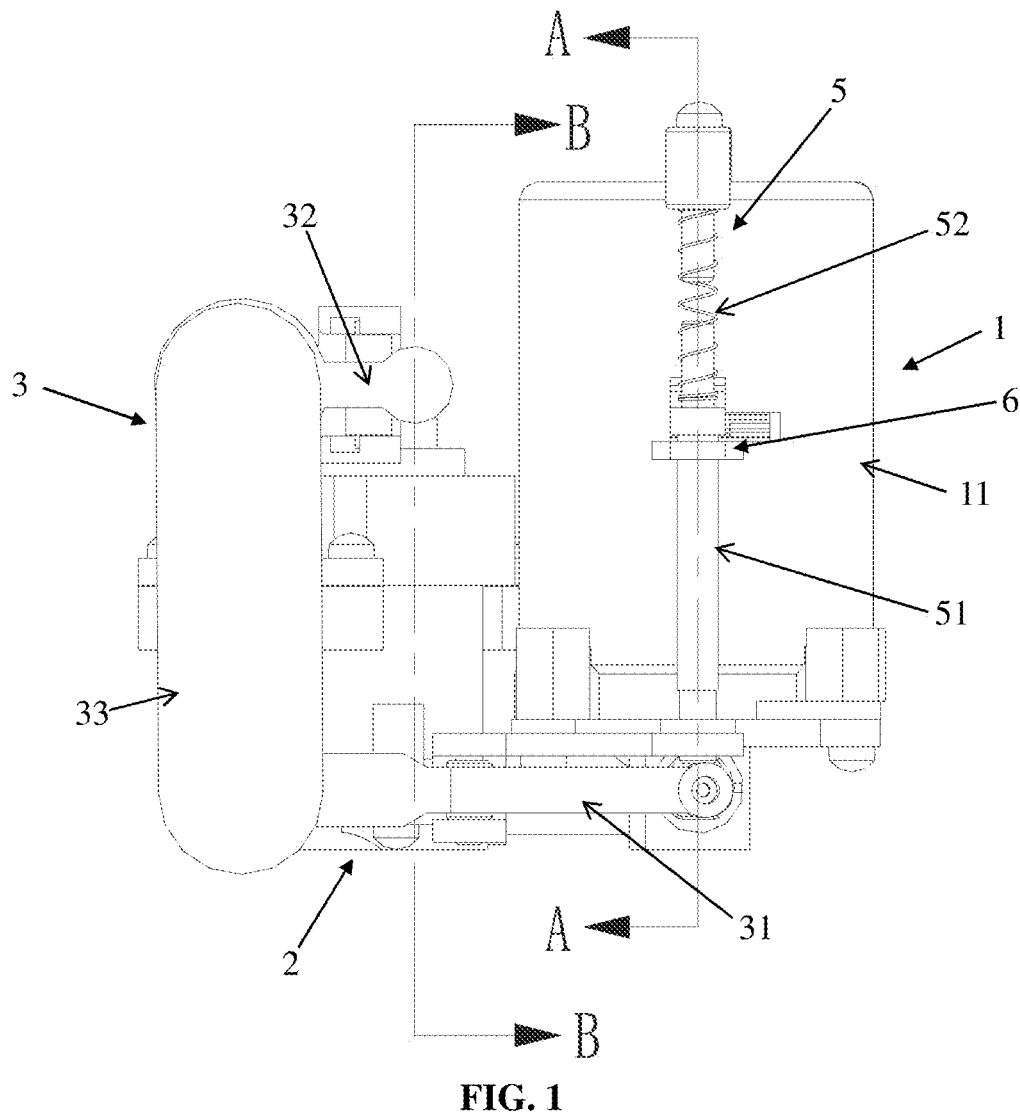
Figure 2:
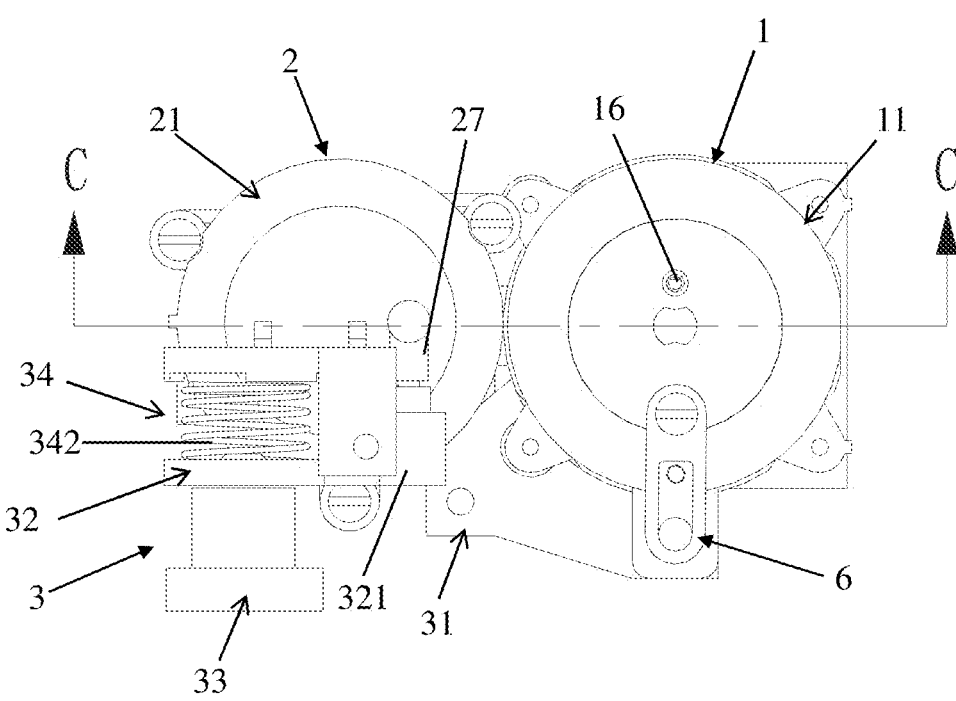
FIG. 2 is a top view of the pneumatic drain valve driving device shown in FIG. 1.
Figure 3:
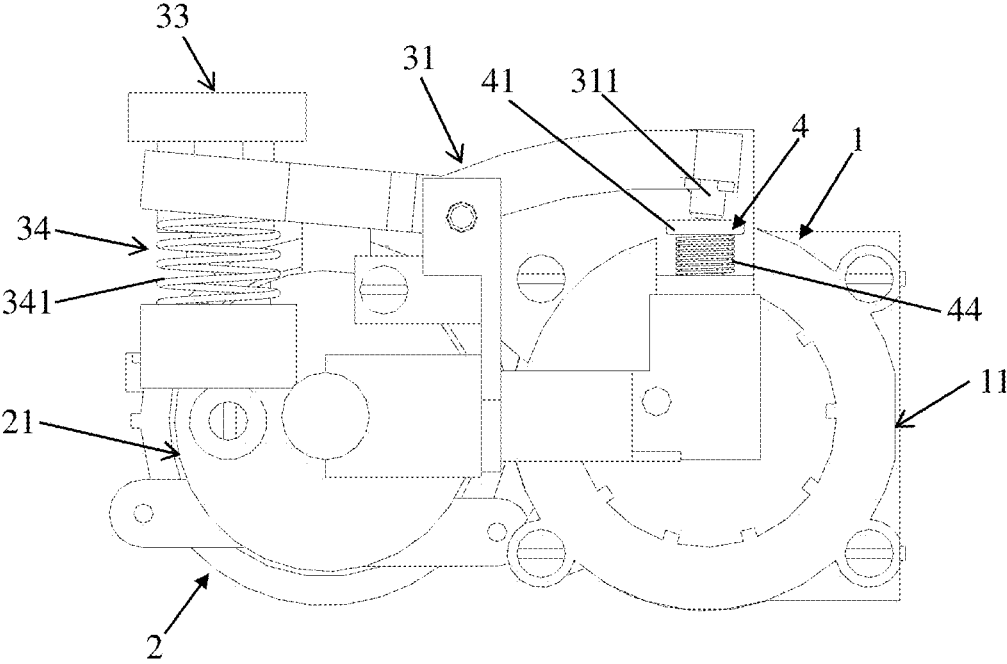
FIG. 3 is a bottom view of the pneumatic drain valve driving device shown in FIG. 1.

In an embodiment, as shown in FIGS. 2 and 3, the resilient reset member 34 comprises a first resilient reset member 341 connected to the first rocker arm 31 and comprises a second resilient reset member 342 connected to the second rocker arm 32.

In this embodiment, the resilient reset member 34 comprises the first resilient reset member 341 and the second resilient reset member 342 configured to respectively drive the first rocker arm 31 and the second rocker arm 32 and have a good reset driving effect. The first resilient reset member 341 is connected between the first rocker arm 31 and the cylinder body 11 and may also be connected between the first rocker arm 31 and the valve case 21 to drive the first rocker arm 31 to reset. A second resilient reset member 342 is connected between the second rocker arm 32 and the valve case 21 to drive the second rocker arm 32 to reset.

In an embodiment, a trigger mechanism 5 is mounted on the cylinder body 11 as shown in FIG. 1, FIG. 4, FIG. 5, FIG. 7, FIG. 10, FIG. 11, FIG. 13, and FIG. 15.

The trigger mechanism 5 comprises a trigger 51 slidably connected to the cylinder body 11 and comprises a resilient driving member 52 configured to drive the trigger 51 to move towards the rocker arm trigger end 311.

The rocker arm trigger end 311 is provided with a limit step 312.

When the rocker arm trigger end 311 is in an initial state (e.g., an untriggered state), the rocker arm trigger end 311 is in contact with the slide valve 4, the slide valve 4 opens the drain hole 17, and the trigger 51 is located on a side of the limit step 312.

When the rocker arm trigger end 311 is in a triggered state, the rocker arm trigger end 311 leaves from the slide valve 4, the slide valve 4 closes the drain hole 17, and an end of the trigger 51 fits in (e.g., is engaged with) the limit step 312.

In this embodiment, the cylinder body 11 is configured with a trigger mechanism 5 configured to restrict the reset of the triggered rocker arm trigger end 311.

Specifically, the trigger mechanism 5 comprises a trigger 51 and a resilient driving member 52. The trigger 51 is disposed on one side of the cylinder body 11 and may move upwards and downwards. The trigger 51 is located above the rocker arm trigger end 311. In an embodiment, the resilient driving member 52 may be a spring, an elastic sheet, or the like, and the resilient driving member 52 is connected between the trigger 51 and the cylinder body 11 configured to drive the trigger 51 to move downward.

The rocker arm trigger end 311 comprises the limit step 312 disposed on an upper surface of the rocker arm trigger end 311.

When the first rocker arm 31 is not triggered, i.e., when the button 33 is not triggered, the rocker arm trigger end 311 is in an initial state (e.g., an untriggered state), and the rocker arm trigger end 311 presses the slide valve 4 to cause the slide valve 4 to open the drain hole 17. At this time, the lower end of the trigger 51 is in contact with the slide valve 4, but the lower end of the trigger 51 is located on one side of the limit step 312.

When the first rocker arm 31 is triggered, i.e., when button 33 is triggered, the rocker arm trigger end 311 is in a triggered state, and the rocker arm trigger end 311 leaves from the slide valve 4. When the limit step 312 is directly disposed below the trigger 51, under the action of the resilient driving member 52, the lower end of the trigger 51 is inserted into the limit step 312 to prevent the rocker arm trigger end 311 from automatically resetting. Thus, the slide valve 4 remains in the state of closing the drain hole 17.

When the rocker arm trigger end 311 needs to be reset, the user only needs to pull up the trigger 51 to allow the lower end of the trigger 51 to leave from the limit step 312.

In an embodiment, as shown in FIGS. 4, 6, 11, and 15, one side of the trigger 51 is provided with a movable rod 511, the movable rod 511 extends into the air chamber 13 through the air chamber communication port 15.

The piston 12 comprises a flange 120 configured to jack up the movable rod 511.

In this embodiment, the trigger 51 comprises a laterally extending movable rod 511 that extends from the air chamber communication port 15 into the air chamber 13. The movable rod 511 can move up and down in the air chamber communication port 15.

Meanwhile, a flange 120 is configured in the lower portion of the piston 12 configured to jack up the movable rod 511 and thus to allow the lower end of the trigger 51 to leave from the limit step 312.

Specifically, when the piston 12 moves upwards to compress the air in the air chamber 13 and when the flange 120 moves upwards with the piston 12 to the bottom of the movable rod 511, the flange 120 brings the movable rod 511 to move upwards together, the lower end of the trigger 51 leaves from the limit step 312, and the first rocker arm 31 can be reset.

When the inflation is completed, the piston 12 moves downwards to return to its original position, the movable rod 511 drops back to its original position along with the flange 120, and the trigger 51 is reset under the action of the resilient driving member 52.

In an embodiment, as shown in FIGS. 1, 2, 5, 7, and 18, a bracket 6 is mounted on one side of the cylinder body 11, and the trigger 51 is mounted on the bracket 6.

The bracket 6 is provided with a guiding hole 61, the trigger 51 extends through the guiding hole 61 with a clearance therebetween.

In this embodiment, a bracket 6 is mounted on one side of the cylinder body 11, the bracket 6 is provided with a mounting plate, and the guiding hole 61 is provided on the mounting plate.

The trigger 51 is slidably connected to the bracket 6, and the trigger 51 extends through the guiding hole 61 with a clearance therebetween, and the guiding hole 61 plays a guiding role to guide the trigger 51 to move up and down.

A top base is mounted on the top of the bracket 6, and an upper end of the resilient driving member 52 is connected to the top base and a lower end thereof is connected with the trigger 51.

In an embodiment, as shown in FIGS. 4, 11, 15, and 18, the slide valve 4 comprises a slide valve body 41, a slide valve connection lever 42, and a slide valve sealing end 43 connected in sequence.

The slide valve body 41 is disposed at an outer side of the cylinder body 11, the slide valve connection lever 42 extends through the drain hole 17 with a clearance therebetween, and the slide valve sealing end 43 is located in the liquid chamber 14.

A resilient actuating member 44 is connected between the slide valve body 41 and the cylinder body 11 and configured to drive the slide valve 4 to slide outwards.

When the button 33 is in an initial state (e.g., an untriggered state), the rocker arm trigger end 311 presses the slide valve body 41.

When the button 33 is in a triggered state, the rocker arm trigger end 311 is separated from the slide valve body 41.

In this embodiment, the slide valve 4 comprises a slide valve body 41, a slide valve connection lever 42, and a slide valve sealing end 43 connected in sequence.

The diameter of the slide valve connection lever 42 is smaller than the diameter of the drain hole 17. The slide valve sealing end 43 is located in the liquid chamber 14, and the diameter of the slide valve sealing end 43 is larger than the diameter of the drain hole 17. The slide valve sealing end 43 can seal or block the opening of the drain hole 17 so as to close the drain hole 17. The slide valve body 41 is located at the outer side of the cylinder body 11 and can be triggered by the action of the rocker arm trigger end 311, so as to make the slide valve 4 slide towards the liquid chamber 14.

In an embodiment, the resilient actuating member 44 may be a spring, an elastic sheet, or the like The resilient actuating member 44 is disposed between the cylinder body 11 and the slide valve body 41 and configured to drive the slide valve 4 to move towards the outer side of the cylinder body 11, so as to allow the slide valve sealing end 43 to seal or block the opening of the drain hole 17.

When the button 33 is in the initial state (e.g., an untriggered state), the rocker arm trigger end 311 presses the slide valve body 41, and the force applied by the resilient reset member 34 is greater than the force applied by the resilient actuating member 44. Thus, the slide valve 4 is caused to move towards the liquid chamber 14, the slide valve sealing end 43 leaves from the opening of the drain hole 17, and the drain hole 17 is opened.

When the button 33 is in the triggered state, the rocker trigger end 311 leaves from the slide valve body 41, and the slide valve sealing end 43 seals or blocks the opening of the drain hole 17 under the action of the resilient actuating member 44.

In an embodiment, as shown in FIG. 18, the slide valve sealing end 43 is assembled with a slide valve sealing ring 45 to promote the sealing effect for the drain hole 17.

Figure 4:
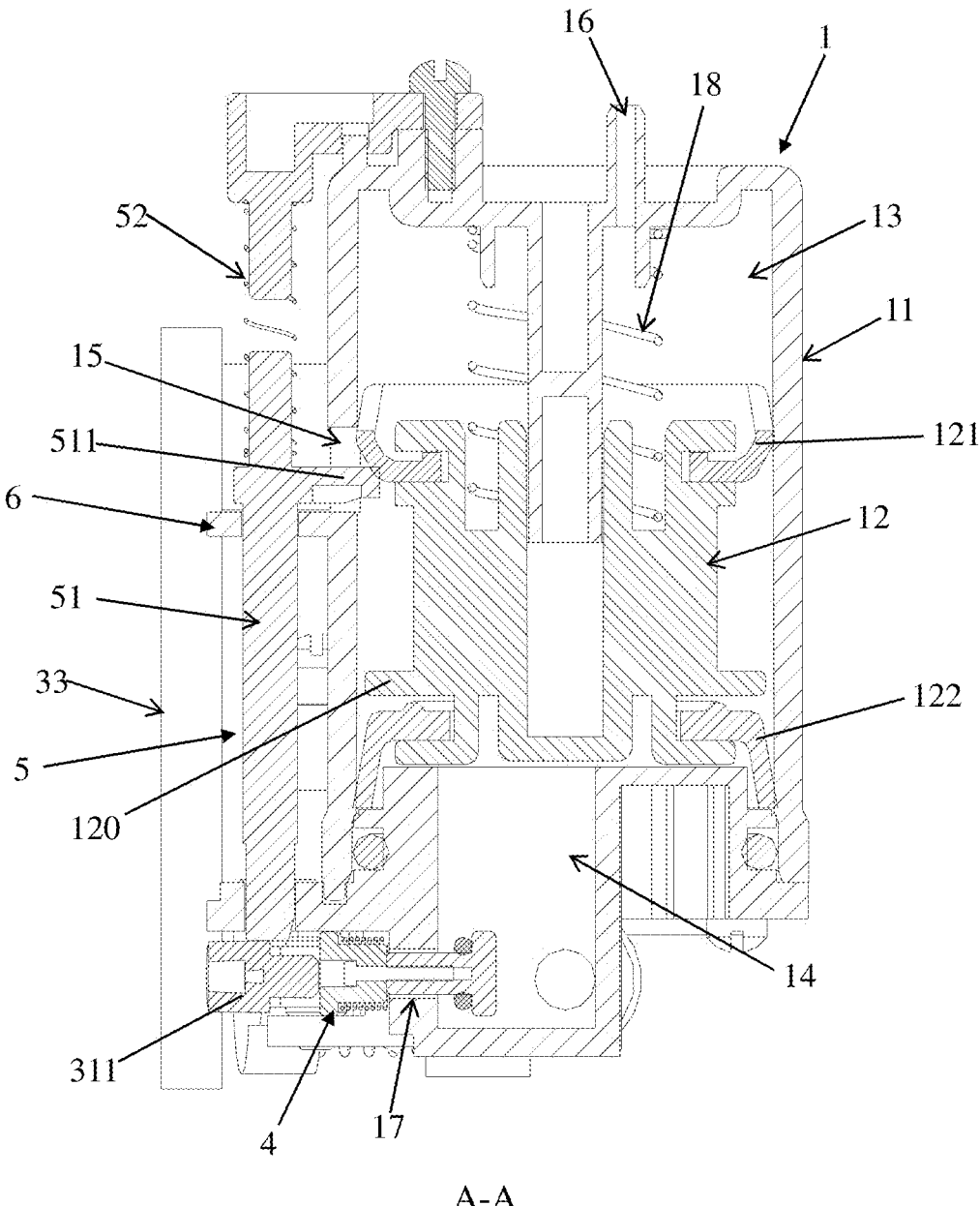
FIG. 4 is a sectional view of the pneumatic drain valve driving device shown in FIG. 1 along an A-A direction.
Figure 5:
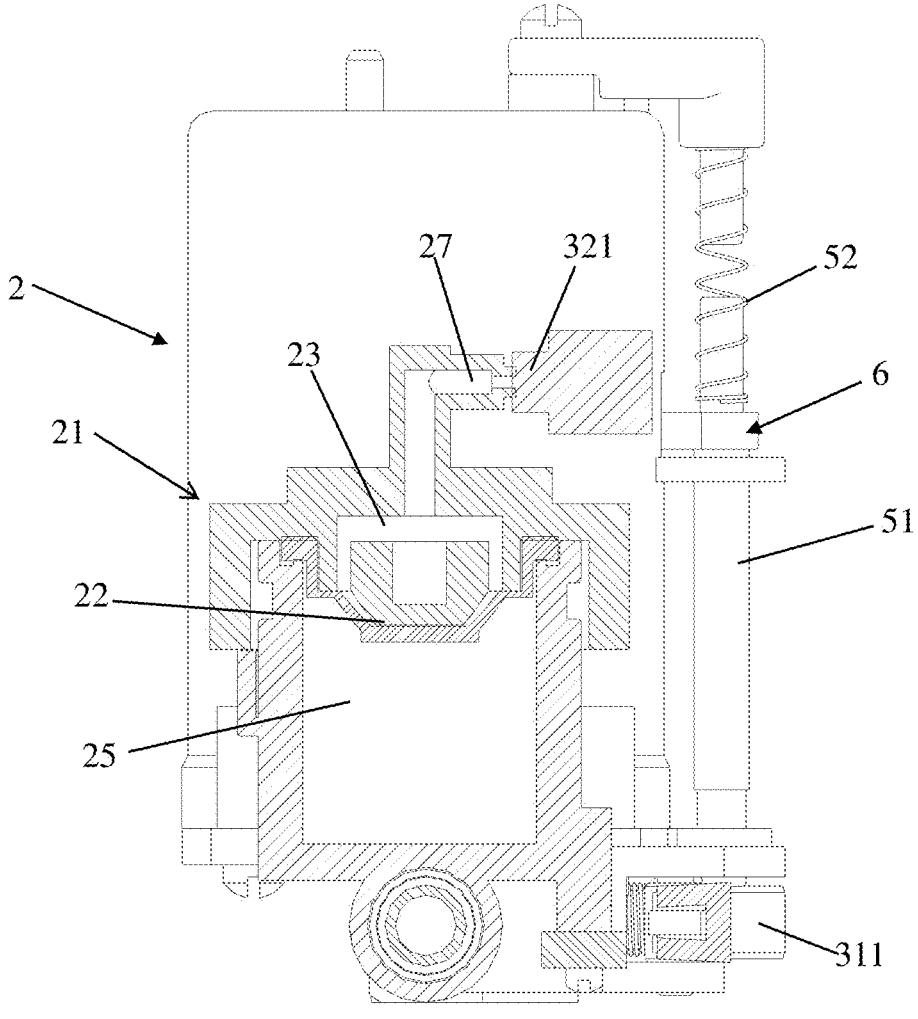
FIG. 5 is a sectional view of the pneumatic drain valve driving device shown in FIG. 1 along a B-B direction.
Figure 6:
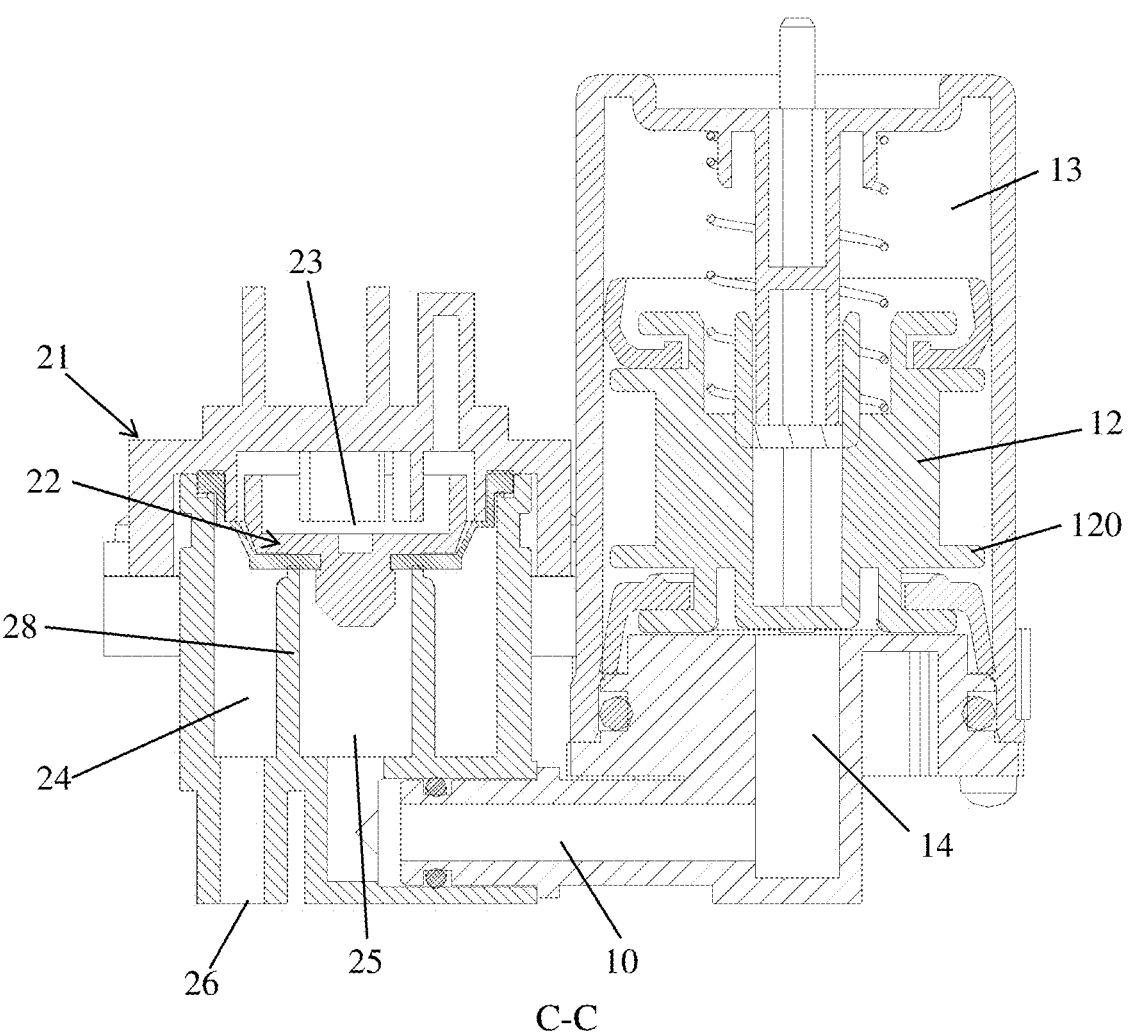
FIG. 6 is a sectional view of the pneumatic drain valve driving device shown in FIG. 2 along a C-C direction.

In an embodiment, as shown in FIGS. 4-6, the air chamber 13 is mounted with a resilient reset element 18 and configured to drive the piston 12 to return to its original position. In an embodiment, the resilient reset element 18 may be a spring, an elastic sheet, and etc. and may facilitate rapid resetting of the piston 12.

In an embodiment, as shown in FIGS. 4, 6, 11, 12, 15, and 16, one end of the piston 12 comprises a first sealing ring 121 configured to form a seal with the chamber wall of the air chamber 13, and the other end of the piston 12 comprises a second sealing ring 122 configured to from a seal with the chamber wall of the liquid chamber 14. Thus, the sealing effect of the piston 12 may be enhanced.

An embodiment of the present disclosure further provides a toilet. FIG. 19 is a schematic view of a toilet, including the pneumatic drain valve driving device according to an example of the present disclosure. As shown in FIG. 19, a toilet 100 comprises a pneumatic drain valve driving device 200, a drain valve 300, and a water tank 400.

The pneumatic drain valve driving device 200 may be the pneumatic drain valve driving device according to any of the foregoing embodiments and may be configured to perform an operation, function, or the like as described in the present disclosure. The detailed descriptions regarding the pneumatic drain valve driving device are incorporated herein. The drain valve 300 may be a pneumatic drain valve and controlled by the pneumatic drain valve driving device 200. The water tank 400 may discharge water in the water tank for flushing the toilet 100 when the pneumatic drain valve driving device 200 opens the drain valve 300.

As described above, when the slide valve 4 closes the drain hole 17 and the waterway 10 supplies water to the liquid chamber 14, the water is accumulated in the liquid chamber 14, and the piston 12 is jacked (e.g., raised) upwards by the water pressure. The air in the air chamber 13 is compressed, and the compressed air enters the drain valve 300 through the air chamber exhaust port 16 to drive the drain valve 300 to open. Thus, the water from the water tank 400 may be discharged for flushing the toilet 100.

In an embodiment, the toilet may further include a base (e.g., a pedestal, bowl, etc.) and a tank (e.g., the water tank 400). The base is configured to be attached to another object such as a drainpipe, floor, or another suitable object. The base includes a bowl, a sump (e.g., a receptacle) disposed below the bowl, and a trapway fluidly connecting the bowl to a drainpipe or sewage line. The tank may be supported by the base, such as an upper surface of a rim. The tank may be integrally formed with the base as a single unitary body. In other embodiments, the tank may be formed separately from the base and coupled (e.g., attached, secured, fastened, connected, etc.) to the base. The toilet may further include a tank lid covering an opening and inner cavity in the tank. The toilet may include a seat assembly including a seat and a seat cover rotatably coupled to the base. The toilet arrangement may further include a hinge assembly.

In another embodiment, the toilet arrangement may be a tankless toilet. The toilet arrangement includes a base and a seat assembly coupled to the base. The base includes a bowl, a sump disposed below the bowl, and a trapway fluidly connecting the bowl to a drainpipe or sewage line. The toilet arrangement includes a waterline that supplies the toilet with water. The toilet may further include a seat assembly including a seat and a seat cover rotatably coupled to the base. The toilets described above are provided herein as non-limiting examples of toilets that may be configured to utilize aspects of the present disclosure.

In some examples, a bidet may be included in a seat or pedestal of a toilet. In other examples, the bidet may be manufactured separately from and attached or coupled to a seat or pedestal of a toilet. The bidet includes a housing. The housing is configured to receive a flow of water through a housing inlet and dispense the flow of water from a housing outlet. The housing inlet and housing outlet may be located on opposite ends of the housing from one another, such that water may flow through the housing from the housing inlet to the housing outlet. In some examples, the housing further includes a chamber. As the housing receives the flow of water, the chamber may fill with water and provide a flow of water between the housing inlet and the housing outlet. The chamber may be configured to contain the flow of water and direct the flow of water from the housing inlet to the housing outlet. After the chamber has filled with water, the flow of water may travel along a substantially linear path between the housing inlet and the housing outlet. In some examples, one or more walls within the housing may be included to help direct a flow of water between the housing inlet and the housing outlet. The bidet may further include a housing inlet conduit configured to direct a flow of water to the housing inlet. The housing inlet conduit may be coupled to a water supply such as tank or waterline. The housing may further include a gear assembly or a portion of the gear assembly.

An embodiment of the present disclosure further provides a method for flushing a toilet. FIG. 20 is a flow chart of a method for flushing a toilet by using a pneumatic drain valve driving device according to an example of the present disclosure. The pneumatic drain valve driving device used by the method may be the pneumatic drain valve driving device according to any of the foregoing embodiments and may be configured to perform an operation, function, or the like as described in the present disclosure. The toilet flushed by the pneumatic drain valve driving device may be the toilet according to any of the foregoing embodiments and may be configured to perform an operation, function, or the like as described in the present disclosure. The detailed descriptions regarding the pneumatic drain valve driving device and the toilet are incorporated herein.

At act S101, the linkage trigger mechanism 3 in the untriggered state maintains the pilot valve control port 27 of the pilot valve 2 closed to stop supplying the water into the liquid chamber 14 of the pneumatic drain valve driving device 200.

Specifically, as described above, when the linkage trigger mechanism 3 is in the initial state, i.e., when the user does not trigger the linkage trigger mechanism 3 (e.g., in the "untriggered state"), the linkage trigger mechanism 3 keeps the pilot valve control port 27 in a closed state, and the linkage trigger mechanism 3 acts on the slide valve 4 to keep the drain hole 17 open. At this time, the waterway 10 stops supplying the water to the liquid chamber 14, and the piston 12 is disposed in the liquid chamber 14. External air enters the air chamber 13 through the air chamber communication port 15.

At act S102, the linkage trigger mechanism 3 in the triggered state opens the pilot valve control port 27 to supply the water into the liquid chamber 14.

Specifically, as described above, when the linkage trigger mechanism 3 is in the triggered state, i.e., when the user triggers and operates the linkage trigger mechanism 3, the linkage trigger mechanism 3 moves away from the pilot valve control port 27, the pilot valve control port 27 is opened, the linkage trigger mechanism 3 moves away from the slide valve 4, and the slide valve 4 closes the drain hole 17. At this time, the waterway 10 starts supplying the water, and the water enters into the liquid chamber 14 through the waterway 10, and the liquid chamber 14 is in the state of storing the water.

At act S103, the pressure of the water in the liquid chamber 14 moves the piston 12 upwards to compress the air in the air chamber 13 of the pneumatic drain valve driving device 200.

Specifically, as described above, the piston 12 is located in a lower portion of the liquid chamber 14. The piston 12 divides the chamber of the cylinder body 11 into the air chamber 13 and the liquid chamber 14. The air chamber 13 comprises the air chamber communication port 15 in air communication with the external place (e.g., the outside of the cylinder body 11) and comprises the air chamber exhaust port 16 configured to be connected to the drain valve 300. When the liquid chamber 14 is in the state of storing the water, the piston 12 is jacked (e.g., raised) up to move upwards, and the air in the air chamber 13 is compressed.

At act S104, the compressed air opens the drain valve 300 of the toilet 100 to discharge the water in the water tank 400 of the toilet 100.

Specifically, as described above, when the air in the air chamber 13 is compressed, the compressed air enters the drain valve 300 through the air chamber exhaust port 16 to drive the drain valve 300 to open, and the water in the water tank 400 is discharged for flushing the toilet.

The above technical solutions may be combined as required to achieve the best technical effect.

The above are merely the principle and the embodiments of the present disclosure. It should be pointed out that, for those having ordinary skill in the art, other modifications may be made based on the principle of the present disclosure and should also be regarded as falling in the protection scope of the present disclosure.

We claim:

1. A pneumatic drain valve driving device, comprising:
a cylinder, comprising:
  a cylinder body;
  an air chamber, comprising:
    an air chamber communication port in air communication with an outside of the cylinder body; and
    an air chamber exhaust port configured to be connected to a drain valve;
  a liquid chamber, comprising:
    a drain hole configured to receive a slide valve;
  a piston disposed in the cylinder body and configured to divide the cylinder body into the air chamber and the liquid chamber;
a pilot valve, connected to the liquid chamber through a waterway, the pilot valve comprising a pilot valve control port; and
a linkage trigger mechanism disposed between the pilot valve control port and the slide valve and configured to control an opening and a closing of the pilot valve control port and the slide valve.

2. The pneumatic drain valve driving device according to claim 1,
wherein when the linkage trigger mechanism is in an untriggered state, the pilot valve control port is in a closed state, the slide valve opens the drain hole, and the waterway stops supplying water into the liquid chamber, and
wherein when the linkage trigger mechanism is in a triggered state, the pilot valve control port is in an open state, the slide valve closes the drain hole, the waterway supplies the water into the liquid chamber, the liquid chamber stores the water, and the air chamber exhaust port exhausts air.

3. The pneumatic drain valve driving device according to claim 1, wherein the linkage trigger mechanism comprises:
a first rocker arm, pivotably connected to the cylinder body, the first rocker arm comprising a rocker arm trigger end configured to be in contact with and separated from the slide valve;
a second rocker arm, pivotally connected to a valve case of the pilot valve, the second rocker arm comprising a rocker arm sealing end configured to close and open the pilot valve control port;
a button connected between the first rocker arm and the second rocker arm; and
a resilient reset member connected to the button, the first rocker arm, or the second rocker arm.

4. The pneumatic drain valve driving device according to claim 3,
wherein when the button is in an untriggered state, the rocker arm trigger end remains in contact with the slide valve, and the rocker arm sealing end closes the pilot valve control port, and
wherein when the button is in a triggered state, the rocker arm trigger end is separated from the slide valve, and the rocker arm sealing end is separated from the pilot valve control port to open the pilot valve control port.

5. The pneumatic drain valve driving device according to claim 3, wherein the resilient reset member comprises:
a first resilient reset member connected to the first rocker arm; and
a second resilient reset member connected to the second rocker arm.

6. The pneumatic drain valve driving device according to claim 3, further comprising a trigger mechanism disposed in the cylinder body,
wherein the trigger mechanism comprises:
a trigger slidably connected to the cylinder body; and
a resilient driving member configured to drive the trigger to move towards the rocker arm trigger end.

7. The pneumatic drain valve driving device according to claim 6,
wherein the rocker arm trigger end comprises a limit step,
wherein when the rocker arm trigger end is in an untriggered state, the rocker arm trigger end is in contact with the slide valve, the slide valve opens the drain hole, and the trigger is disposed on a side of the limit step, and
wherein when the rocker arm trigger end is in a triggered state, the rocker arm trigger end is separated from the slide valve, the slide valve closes the drain hole, and an end of the trigger is engaged with the limit step.

8. The pneumatic drain valve driving device according to claim 6, further comprising:
a movable rod disposed on a side of the trigger and extending into the air chamber through the air chamber communication port; and a flange disposed on the piston and configured to raise up the movable rod.

9. The pneumatic drain valve driving device according to claim 6, further comprising: a bracket disposed on a side of the cylinder body, wherein the bracket comprises a guiding hole, and wherein the trigger is disposed on the bracket and extends through the guiding hole.

10. The pneumatic drain valve driving device according claim 3, further comprising:

a slide valve body, disposed on an outer side of the cylinder body;

a slide valve connection lever, extending through the drain hole;

a slide valve sealing end disposed in the liquid chamber; and a resilient actuating member connected between the slide valve body and the cylinder body and configured to drive the slide valve to slide outwardly.

11. The pneumatic drain valve driving device according claim 10, wherein when the button is in an untriggered state, the rocker arm trigger end presses the slide valve body, and wherein when the button is in a triggered state, the rocker arm trigger end is separated from the slide valve body.

12. The pneumatic drain valve driving device according to claim 11, further comprising a resilient reset element disposed in the air chamber and configured to drive the piston to reset.

13. The pneumatic drain valve driving device according to claim 10, further comprising a slide valve sealing ring disposed on the slide valve sealing end.

14. The pneumatic drain valve driving device according to claim 1, further comprising:

a first sealing ring disposed on a first end of the piston and configured to form a seal with a chamber wall of the air chamber; and a second sealing ring disposed on a second end of the piston and configured to form a seal with the chamber wall of the liquid chamber.

\* \* \* \* \*